United States Patent
Andreica et al.

(10) Patent No.: US 10,860,799 B2
(45) Date of Patent: Dec. 8, 2020

(54) ANSWERING ENTITY-SEEKING QUERIES

(71) Applicant: Google LLC, Mountain View, CA (US)

(72) Inventors: Mugurel Ionut Andreica, Adliswil (CH); Tatsiana Sakhar, Mountain View, CA (US); Behshad Behzadi, Freienbach (CH); Marcin M. Nowak-Przygodzki, Zurich (CH); Adrian-Marius Dumitran, Zurich (CH)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 15/991,513

(22) Filed: May 29, 2018

(65) Prior Publication Data

US 2019/0370326 A1   Dec. 5, 2019

(51) Int. Cl.
| | |
|---|---|
| *G06F 17/27* | (2006.01) |
| *G06F 40/295* | (2020.01) |
| *G06F 16/31* | (2019.01) |
| *G06F 16/332* | (2019.01) |
| *G06F 40/211* | (2020.01) |
| *G06F 17/21* | (2006.01) |

(52) U.S. Cl.
CPC .......... *G06F 40/295* (2020.01); *G06F 16/322* (2019.01); *G06F 16/3329* (2019.01); *G06F 40/211* (2020.01)

(58) Field of Classification Search
CPC .. G06F 40/295; G06F 40/211; G06F 16/3329; G06F 16/322

USPC .......................................................... 704/9
See application file for complete search history.

(56) References Cited

U.S. PATENT DOCUMENTS

| | | | |
|---|---|---|---|
| 6,675,159 B1 | 1/2004 | Lin et al. | |
| 9,116,918 B1 | 8/2015 | Kim | |
| 2003/0233224 A1* | 12/2003 | Marchisio | G06F 17/271 704/4 |
| 2010/0332499 A1 | 12/2010 | Pan et al. | |
| 2012/0059838 A1 | 3/2012 | Bernstson et al. | |
| 2016/0132501 A1 | 5/2016 | Mengle et al. | |
| 2018/0150552 A1* | 5/2018 | Wang | G06F 40/289 |

FOREIGN PATENT DOCUMENTS

WO   WO 2012/067586   5/2012

OTHER PUBLICATIONS

PCT International Search Report in International Application No. PCT/US2019/019480, dated Apr. 29, 2019, 13 pages.

* cited by examiner

*Primary Examiner* — Thierry L Pham
(74) *Attorney, Agent, or Firm* — Fish & Richardson P.C.

(57) ABSTRACT

In some implementations, a query that includes a sequence of terms is obtained, the query is mapped, based on the sequence of the terms, to a dependency tree that represents dependencies among the terms in the query, an entity type that corresponds to an entity sought by the query is determined based on a term represented by a root of the dependency tree, a particular entity is identified based on both the entity type and a relevance of the entity to the terms in the query, and a response to the query is provided based on the particular entity that is identified.

14 Claims, 4 Drawing Sheets

ANSWERING ENTITY-SEEKING QUERIES

FIELD

This specification generally relates to handling queries from users.

BACKGROUND

Computing systems may handle various queries from users. For example, a query may be in a form of a sequence of terms that make up a search query and a computing system may, in response to receiving the search query, provide search results responsive to the search query. For example, a search query may be "Isaac Asimov books."

Other queries may be commands for a computing system to execute. For example, a query may be a voice command of "Turn off lights in the living room" and the computing system may, in response to receiving an utterance of "Turn off lights in the living room," turn off the lights in a living room and provide an acknowledgement of "Lights have been turned off in the living room." Still other queries may be questions for a computing system to provide an answer. For example, a query may be a question of "What temperature is it outside" and the computing system may, in response, provide an answer of "The current outdoor temperature in Mountain View, Calif. is 70° F."

SUMMARY

A system that handles queries from users may receive some queries that seek one or more entities and may receive some queries that do not seek one or more entities. For example, a system may receive a query that seeks an entity where the query is "What is the hotel that looks like a sail," may identify an entity that is the Burj Al Arab Jumeirah, and then provide a response of "The Burj Al Arab Jumeirah." In another example, a system may receive a query that does not seek one or more entities where the query is "What is the weather today" and may resolve the query by providing a response of "The weather will be between 60-70° F. and sunny today."

The system may perform particular actions for queries that seek one or more entities. An action the system may perform may include identifying one or more types of entities that a query is seeking, and determining whether the query is seeking one specific entity or potentially multiple entities. For example, the system may determine that a query of "What is the hotel that looks like a sail" seeks a single entity that is a hotel. In another example, the system may determine that a query "What restaurants nearby serve omelets" seeks potentially multiple entities that are restaurants.

An additional or alternative action the system may perform may include finding a most relevant entity or entities of the identified one or more types, and presenting what is identified to the user if sufficiently relevant to the query. For example, the system may identify that the Burj Al Arab Jumeirah is an entity that is a hotel and is sufficiently relevant to the terms "looks like a sail," and, in response, audibly output synthesized speech of "Burj Al Arab Jumeirah."

Yet another addition or alternative action may include initiating a dialog with the user in order to ask for more details about the one or more entities that are sought. For example, the system may determine that a query is seeking a restaurant and two entities that are restaurants are very relevant to the terms in the query and, in response, ask the user "Can you give me more details" and concatenate additional input from the user to the original query and re-execute the concatenated query.

Still another additional or alternative action may include identifying subqueries of a query which are entity-seeking, using the above actions to answer the subquery, and then replacing the subqueries by their answers in the original query in order to obtain a partially resolved query which can be executed. For example, the system may receive a query of "Call the hotel that looks like a sail," determine that "the hotel that looks like a sail" is a subquery that seeks an entity, determine an answer to the subquery is "Burj Al Arab Jumeirah," in response replace "the hotel that look like a sail" in the query with "The Burj Al Arab Jumeirah" to obtain a partially resolved query of "Call the Burj Al Arab Jumeirah," and then execute the partially resolved query.

Another additional or alternative action may include identifying that a user is seeking entities and adapting how the system resolve queries accordingly. For example, the system may determine that sixty percent of the previous five queries that a user issued in the past two minutes sought entities and, in response, determine that a next query that a user provides is more likely a query that seeks an entity as an answer and process the query accordingly.

In some implementations an advantage may be that the system may be able to more quickly resolve queries in a manner that satisfies a user. For example, the system may be able to immediately provide a response of "The Burj Al Arab Jumeirah" in response to the query "What hotel looks like a sail" where another system may instead provide a response of "no results found" or provide a response that is a search results listing for the query.

An additional or alternative advantage may be that the system may be able to more efficiently identify an entity sought by a query. For example, the system may determine that a query is seeking an entity of the type "hotel" and, in response, limit a search to only entities that are hotels instead of searching across multiple entities including entities that are not hotels.

Further to the descriptions herein, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed.

For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In general, one innovative aspect of the subject matter described in this specification is embodied in methods that include the actions of obtaining a query that includes a sequence of terms, mapping, based on the sequence of the terms, the query to a dependency tree that represents dependencies among the terms in the query, determining an entity type that corresponds to an entity sought by the query based on a term represented by a root of the dependency tree, identifying a particular entity based on both the entity type and a relevance of the entity to the terms in the query, and providing a response to the query based on the particular entity that is identified.

In some implementations, determining an entity type that corresponds to an entity sought by the query based on a term represented by a root of the dependency tree includes determining the term represented by the root of the dependency tree represents a type of entity. In certain aspects, determining an entity type that corresponds to an entity sought by the query based on a term represented by a root of the dependency tree includes identifying a node in the tree that represents a term that represents a type of entity and includes a direct child that represents a term that indicates an action to perform. In some aspects, identifying a node in the tree that represents a term that represents a type of entity and includes a direct child that represents a term that indicates an action to perform includes determining that the root represents a term that represents a type of entity and includes a direct child that represents a term that indicates an action, and in response to determining that the root represents a term that represents and type of entity and includes a direct child that represents a term that indicates an action, identifying the root.

In some implementations, identifying a particular entity based on both the entity type and a relevance of the entity to the terms in the query includes determining a relevance threshold based on the entity type, determining a relevance score of the particular entity based on the query satisfies the relevance threshold, and, in response to determining the relevance score of the particular entity based on the query satisfies the relevance threshold, identifying the particular entity. In certain aspects, identifying a particular entity based on both the entity type and a relevance of the entity to the terms in the query includes identifying the particular entity and another entity based on a determination from the dependency tree that the query is not exclusively seeking a single entity. In some aspects, identifying a particular entity based on both the entity type and a relevance of the entity to the terms in the query includes requesting additional input in response to a determination that multiple entities are relevant to the query and are of the entity type and that the query is exclusively seeking a single entity.

In some implementations, determining that an amount of queries received that sought an entity satisfy a threshold and in response to determining that an amount of queries received that sought an entity satisfy a threshold, entering an answer seeking mode that resolves queries in favor of seeking an entity. In certain aspects, the dependency tree is a semantic dependency tree. In some aspects, the dependency tree is a syntactic dependency tree.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
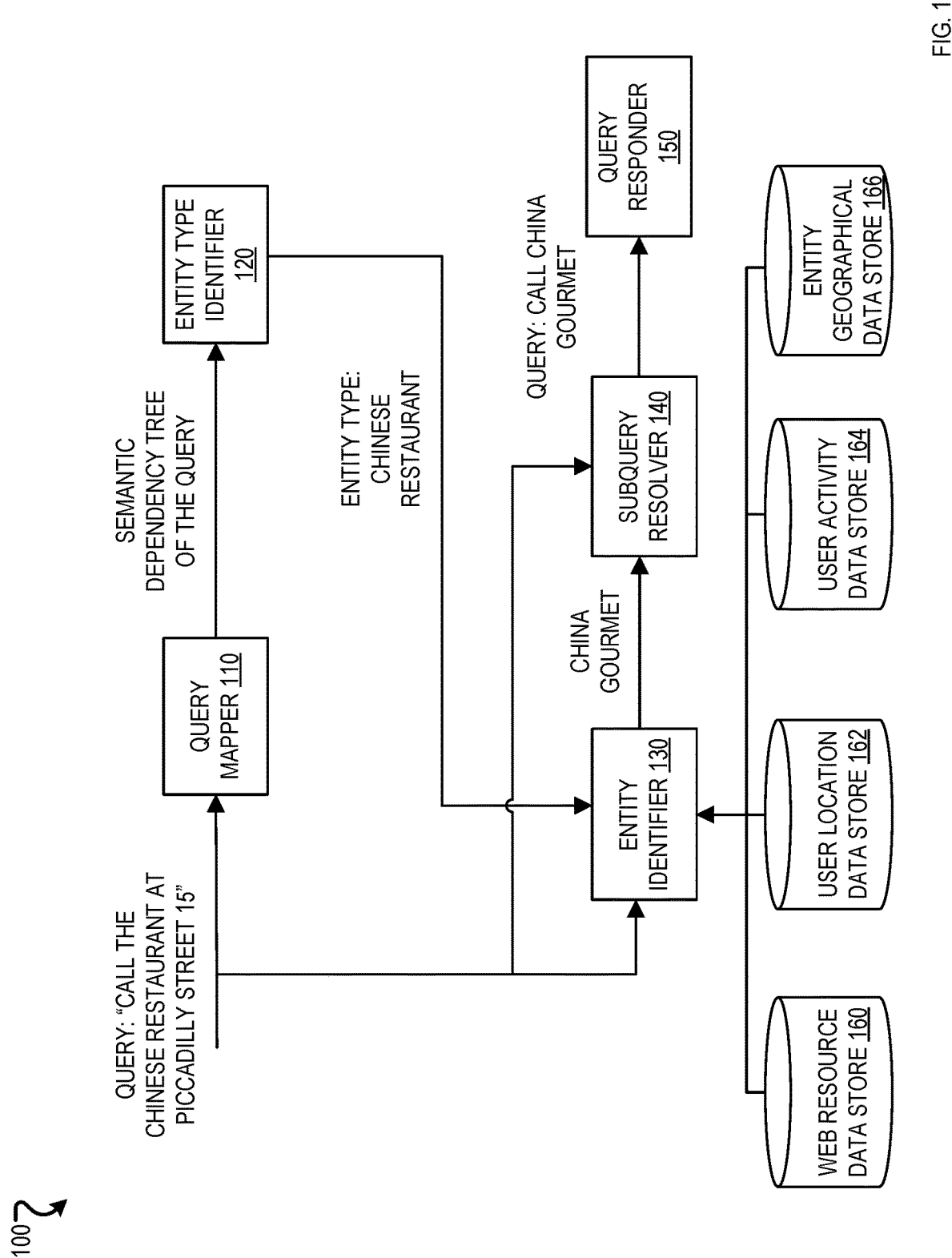
FIG. 1 is a block diagram that illustrates an example system that handles queries that seek entities.

FIG. 1 is a block diagram that illustrates an example system 100 that handles queries that seek entities. Briefly and as will be described below in more detail, the system 100 includes a query mapper 110 that may map a query that include a sequence of terms to a semantic dependency tree, an entity type identifier 120 that may determine an entity type based on the semantic dependency tree, an entity identifier 130 that may receive the query, the entity type that is determined, and data from various data stores 160, 162, 164, 166 and identify an entity, a subquery resolver 140 that may partially resolve the query based on the entity that is identified, and a query responder 150 that may provide a response to the query.

The query mapper 110 may receive a query that includes a sequence of terms and map the query to a semantic dependency tree. For example, the query mapper 110 may receive the query of "Call the Chinese restaurant on Piccadilly Street 15" and map the query to a semantic dependency tree, e.g., the semantic dependency tree shown in FIG. 2.

Figure 2:
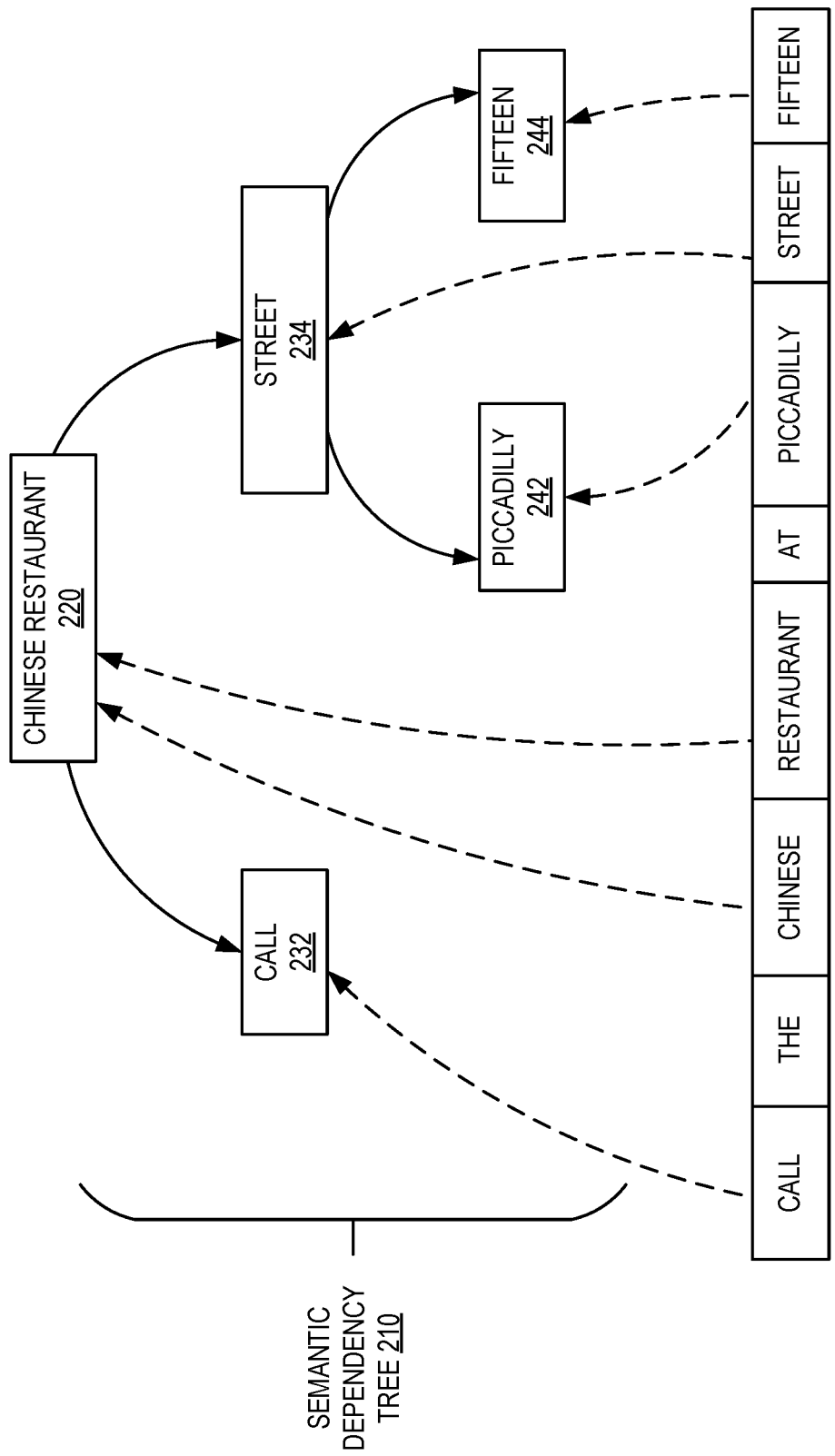
FIG. 2 is an illustration of an example semantic dependency tree.

FIG. 2 is an illustration of an example semantic dependency tree 200. A semantic dependency tree for a query may be a graph that includes nodes, that each represent one or more terms in a query, and directed edges between the nodes. A directed edge that originates from a first node and ends at a second node may indicate that the one or more terms represented by the first node are modified by the one or more terms represented by the second node. A node at which an edge ends may be considered a child of a node from which the edge originates. A root of a semantic dependency tree may be a node that represents one or more terms that do not modify other terms in a query and are modified by other terms in the query. A semantic dependency tree may only include a single root.

The semantic dependency tree 200 shown in FIG. 2 may be a representation of a semantic dependency tree generated by the query mapper 110 for the query "Call the Chinese restaurant on Piccadilly Street 15." The semantic dependency tree 200 includes a root 220 that represents the term "Chinese restaurant," directed edges from the root towards children 232, 234 that represent the terms "Call" and "Street," respectively, and directed edges from the child 234 to children 242, 244 that represent the terms "Piccadilly" and "Fifteen."

Returning back to FIG. 1, the entity type identifier 120 may identify one or more entities based on the semantic dependency tree. For example, the entity type identifier 120 may receive a representation of the semantic dependency tree shown in FIG. 2 and identify an entity type of "Chinese restaurant." An entity type may refer to a category of entities. For example, entities that are Chinese restaurants may all belong to an entity type of "Chinese restaurant" and an entity type of "Restaurant," but not to an entity type of "Movies" or an entity type of "Tourist attractions. Other entity types may include "Celebrities," "Countries," "Songs," etc.

The entity type identifier 120 may determine an entity type that corresponds to an entity sought by the query based on a term represented by a root of the semantic dependency tree. For example, the entity type identifier 120 may determine an entity type of "Chinese restaurant" that corresponds to an sought by the query "Call the Chinese restaurant on Piccadilly Street 15" based on the term "Chinese restaurant" represented by the root 220 of the semantic dependency tree 200. In another example, the entity type identifier 120 may determine an entity type of "song" for the query "play the theme song from the titanic" based on the term "play" represented by the root of the semantic dependency tree for the query not representing an entity type and determining that the root has a child that represents the terms "the theme song" which does represent an entity type of "song."

In some implementations, the entity type identifier 120 may determine the entity type that corresponds to the entity sought be the query based on determining the term represented by the root of the semantic dependency tree represents a type of entity. For example, the entity type identifier 120 may determine the entity type of "Chinese restaurant" based on determining that the root 220 represents the term "Chinese restaurant" which represents a type of entity of "Chinese restaurant." In another example, the entity type identifier 120 may determine an entity type of "movie" based on a different semantic dependency tree for a query that includes a root 220 that represents a term of "movie" which represents an entity type of "movie."

In some implementations, the entity type identifier 120 may determine an entity type that corresponds to an entity sought by the query based on a term represented by a root of the semantic dependency tree by, identifying a node in the tree that represents a term that represents a type of entity and includes a direct child that represents a term that indicates an action to perform. For example, the entity type identifier 120 may obtain a semantic dependency tree where a child of a root is "movie" and that child has a child of "play," identify the child representing "movie" as both the term "movie" represents a type of entity and the child includes a direct child that represents an action of "play" and, in response, determines the entity type of "movie." A direct child of a first node may be a node that a directed edge ends, where the directed edge originates from the first node.

In some implementations, the entity type identifier 120 may identify a node in the tree that represents a term that represents a type of entity and includes a direct child that represents a term that indicates an action to perform by, determining that the root represents a term that represents a type of entity and includes a direct child that represents a term that indicates an action and, in response to determining that the root represents a term that represents a type of entity and includes a direct child that represents a term that indicates an action, identifying the root. For example, the entity type identifier 120 may determine that a root of a tree represents the term "song" which represents an entity type of "song" and includes a direct child that represents a term "play" which represents an action of play and, in response, identify the node.

In some implementations, the entity type identifier 120 may additionally or alternatively determine an entity type based on extracting features from a query. The entity type identifier 120 may obtain the query and extract N-grams which define an entity type, e.g. "movie," "song," "river," "mountain," "who," "where," "person," "guy," etc. The entity type identifier 120 may determine an entity type based on whether the N-gram that defines an entity type is partially or completely included in a larger important N-gram, concept, or entity name from the query together with the relevance of that important N-gram, concept or entity to the query. For example, the entity type identifier 120 may determine that "river" is part of the entity name "Amazon river" so the query is less likely to be seeking an entity type of "river."

The entity type identifier 120 may determine an entity type based on whether entities of a type described by the N-gram already appear in the query. For example, the entity type identifier 120 may determine that "Eiffel Tower," which is an entity of the type tourist attraction, appears in the query "what's there to see near the Eiffel Tower tourist attraction" together with the N-gram "tourist attraction" which also matches the entity type of tourist attraction so the query is seeking an entity type of "tourist attraction."

The entity type identifier 120 may determine whether a query seeks a single entity or multiple entities. For example, the entity type identifier 120 may determine whether the terms defining entity types are singular or plural, e.g., single entity for the query "movie where tom cruise plays pool and while playing pool he dances" as "movie" is singular and multiple entities for the query "movies about a clown fish lost in the ocean" as "movies" is plural. In another example, the entity type identifier 120 may determine for each term in the query defining an entity type, if the term has descendants or ancestors in the semantic dependency tree which may indicate that the user is not seeking a specific entity, together with their distance in the tree from that term, e.g., "find me a movie with penguins dancing at the south pole" seeking singular entity as "a" is close to the term "movie" and "find me any movie with penguins dancing at the south pole" seeking potentially plural entities as "any" is close to the term "movie."

In some implementations, the entity type identifier 120 may also determine a relevance threshold based on the entity type. The relevance threshold may indicate a confidence that an entity is relevant to a query seeking an entity of the particular type. For example, the relevance threshold for an entity type of "Chinese restaurant" may be less than a relevance threshold for an entity type of "restaurant" as the entity type of "restaurant" may include more entities than the entity type of "Chinese restaurant." The entity type identifier 120 may determine a relevance threshold based on accessing a stored predetermined relevance threshold for each type of entity type. For example, the entity type identifier 120 may store a predetermined relevance threshold of 80% for an entity type of "restaurant" and a predetermined relevance threshold of 70% for "Chinese restaurant" and, in response to determining that a query is seeking a "Chinese restaurant," identify the predetermined relevance threshold of 70% that is stored for the entity type "Chinese restaurant."

The entity identifier 130 may receive the query, the entity type that is determined, and data from various data stores 160, 162, 164, 166 and identify an entity. For example, the entity identifier 130 may receive the query "Call the Chinese restaurant on Piccadilly Street 15," an indication of the entity type of "Chinese restaurant," and web resources that describe the entity "China Gourmet" as a Chinese restaurant on Piccadilly Street, and then identify the entity "China Gourmet."

The entity identifier 130 may identify a particular entity by determining a relevance threshold based on the entity type, determining a relevance score of the particular entity based on the query, determining the relevance score satisfies the relevance threshold, and, in response to determining the relevance score satisfies the relevance threshold, identifying the particular entity. For example, the entity identifier 130 may obtain a relevance threshold of 70% for an entity type of "Chinese restaurant," obtain a relevance score of 75% for the entity "China Gourmet" in relation to the query "Call the Chinese restaurant on Piccadilly Street 15," determine that the relevance score of 75% satisfies the relevance threshold of 70% and, in response, identify the entity "China Gourmet."

In some implementations, the entity identifier 130 may identify a particular entity by identifying the particular entity and another entity based on a determination from the semantic dependency tree that the query is not exclusively seeking a single entity. For example, the entity identifier 130 may receive an indication from the entity type identifier 120 that a query is not exclusively seeking a single entity, determine that a relevance score of 75% for the entity "China Gourmet" and a relevance score of 70% for "Panda Cafe" both satisfy a relevance threshold, and, in response, identify both entities.

In some implementations, identifying a particular entity based on both the entity type and a relevance of the entity to the terms in the query includes requesting additional input in response to a determination that multiple entities are relevant to the query and are of the entity type and that the query is exclusively seeking a single entity. For example, the entity identifier 130 may receive an indication from the entity type identifier 120 that query is exclusively seeking a single entity, determine that a relevance score of 75% for the entity "China Gourmet" and a relevance score of 70% for "Panda Cafe" both satisfy a relevance threshold, in response, provide a prompt, "Please provide more details," receive additional input of "Something gourmet," and, in response, identify only the entity "China Gourmet" and not the entity "Panda Cafe."

In some implementations, the entity identifier 130 may query one or more data stores in order to extract a set of entities which are relevant to the user and to the entity-seeking query, and then determine features of the set of entities based on information about the entity in the data stores. For example, the entity identifier 130 may identify an entity from data from one or more of the web resource data store 160, the user location data store 162, the user activity data store 164, and the entity geographical data store 166. In an example of using the web resource data store 160, the entity identifier 130 may provide a query, or a modified version of a query which preserves its semantics, to a web resource search engine and obtain a set of ranked search results. A current user's location may also be sent as part of the request as it may influence the ranking of the results. A user's previous search history may also be used when ranking the results. The entity identifier 130 may iterate through the search results and extract the most relevant entities from each result. For each relevant entity in the result, the entity identifier 130 may compute a relevance to the contents of the result. The entity identifier may keep only the entities which have a type identified by the entity type identifier 120, together with features like ranking information of the results in which the entity appears, e.g., position in the search results ranking, any other scores provided by the search engine or how relevant an entity is to each such result.

In an example of using the user location data store 162, the entity identifier 130 may extract all the entities from a location history of the user which have a type identified by the entity type identifier 120, e.g., hotels, restaurants, universities, etc. along with extracting features associated to each such entity such as the time intervals when the user visited the entity or was near the entity, or how often each entity was visited or the user was near the entity.

In an example of using the user activity data store 164, the entity identifier 130 may extract all the entities that the user was interested in their past interactions that have a type identified by the entity type identifier 120, e.g., movies that the user watched, songs that the user listened to, restaurants that the user looked up and showed interest in or booked, hotels that the user booked, etc. along with features associated to these entities such as, the time intervals when the user showed interest in the entity, and any implicit or explicit feedback that the user provided about the entity.

In an example of using the entity geographical data store 16, the entity identifier 130 may send the query or a modified version of the query which preserves semantics to a service which returns geographically local results and obtains a list of local results matching partially or totally the query. Locations relevant to the user may also be sent as part of the request, e.g., the current user's location, the user's home location, etc. The entity identifier 130 may extract all the entities associated to these local results that have an entity type matching that identified with the entity type identifier 120, together with additional features, e.g., ranking scores, distance to the user's location, ratings, or address of the local result.

The entity identifier 130 may obtain a set of additional features for each entity identified from the data stores. For example, the entity identifier 130 may determine important N-grams, concepts and other entities related to each entity, together with a relatedness score. The relatedness score may reflect a strength of the relationship between the entity and an important N-gram, concept or other entity. If an entity was extracted only from a few data stores, then the entity identifier 130 may query the other data store in order to extract additional information available about each entity.

The entity identifier 130 may compute an initial set of features for the query. For example, the entity identifier 130 may determine important N-grams, concepts and entities from the query together with their relevance scores. Important N-grams and concepts may refer to anything which has a meaning in and of itself, e.g. an address, an attribute, an expression, etc. The entity identifier 130 may reduce the relevance score of N-grams, concepts or entities containing N-grams which define an entity type identified as being sought by the query. The set of features may include N-grams for time periods indicated by the query, N-grams that are particularly relevant for personal queries, and indicators which may suggest that prioritizing entities extracted from some specific data store is desired.

The entity identify 130 may obtain a relevance score for each entity that reflects a confidence that the entity is sought be the query. The relevance score may be determined based on one or more of the features extracted from the data stores that led to the set of entities being identified, the additional features extracted for each entity in the set of entities, and the features extracted from the query.

The subquery resolver 140 may partially resolve the query based on the entity that is identified. For example, the subquery resolver 140 may obtain an indication that the entity "China Gourmet" is identified by the terms "Chinese restaurant at Piccadilly Street 15" in the query "Call the Chinese restaurant on Piccadilly Street 15" and, in response, replace the terms with the name of the entity to obtain a partially resolved query of "Call China Gourmet." The query may then be executed by the system 100. The system 100 may repeatedly resolve subqueries in a single query based on repeating partially resolving terms in the single query.

In some implementations, the subquery resolver 140 may resolve a subquery in a query by identifying one or more candidate substrings of which can be answered, e.g., generating a substring for each sequence of two or more N-grams in the query, score the substrings, determine whether score of the top substring satisfies a threshold, and, if so, replace the substring from the query corresponding to the top substring by the answer to the top substring. For example, the subquery resolver 140 may obtain the query "Call the Chinese restaurant on Piccadilly Street 15," determine a first candidate substring of "Call the Chinese restaurant," a second candidate substring of "Chinese restaurant on Piccadilly Street 15," and other candidate substrings, determine a score of 30% for the first candidate substring and a score of 95% for the second candidate substring, determine that the score of 95% for the second candidate substring is the top score and is above a threshold of 90%, and, in response, replace "Chinese restaurant on Piccadilly Street" with "China Gourmet" in the query. The scores for the substrings may reflect a confidence that the substring is a subquery, where higher scores reflect higher confidence and lower scores reflect lower confidence.

In some implementations, the subquery resolver 140 may determine scores for substrings based on the length of the candidate's substring, whether the substring's answer consists of one or more entities, the semantic dependency tree of the query, whether the substring corresponds to a full subtree in the semantic dependency tree, whether the substring breaks important N-grams, concepts or entity names from the query. The subquery resolver 140 may determine higher scores for one or more of substrings with more terms, substrings that resolve in a single entity, substrings which correspond to full subtrees in the semantic dependency tree, and substrings that don't break important N-grams, concepts or entity names from the query.

The query responder 150 that may provide a response to the query. For example, in response to obtaining the query "Call China Gourmet," the query responder 150 may place a call to the restaurant "China Gourmet" and provide an audible response of "Calling China Gourmet." In another example, in response to receiving an identification of the entity "China Gourmet" as an answer to the query "What Chinese restaurant is at Piccadilly Street 15," the query responder 150 may respond with text of "China Gourmet."

In some implementations, the system 100 may also initiate a dialog with the user in order to ask for more details about the one or more entities that are sought. For example, the system may determine that a query is seeking a restaurant and two restaurants have relevance scores that satisfy a relevance threshold for an entity type of restaurant, in response, ask the user "Can you give me more details," receive an input of "Name includes cafe," and combine the terms "name includes cafe" from the user to the original query and re-execute the combined query of "Call the Chinese restaurant on Piccadilly Street 15 name includes cafe." Combining terms may include concatenating terms or uniting a query and additional details in a modified form. For example, a query of "Chinese restaurant at Piccadilly Street 15" and additional details of "Yes it's a restaurant that serves pastry" may be modified to form a modified query of "Chinese restaurant at Piccadilly Street 15 that serves pastry" that is then executed. In some implementations, the system 100 may execute the additional details as a separate query, determine that only a single entity is relevant to both the query of the additional details and the original query, and, in response, select the entity as an answer to the original query.

In some implementations, the system 100 may also include an answer seeking mode. In the answer seeking mode, the system 100 may increase a likelihood that the system 100 provides an answer to a query. More likely providing an answer to a query may provide a better user experience while a user is seeking answers. For example, when user asks, "What was the name of the young wizard with a sign on his forehead," then asks "Who was Harry Potter's best friend," and then asks, "What city did Ron Weasley grow up in," the user's next query may be more likely to be another query that seeks an answer than when the user has not recently provided any queries that seek answers.

The system 100 may determine that an amount of queries received that sought an entity satisfy a threshold and, in response to determining that an amount of queries received that sought an entity satisfy a threshold, enter the answer seeking mode that resolves queries in favor of seeking an entity. For example, the system 100 may determine that sixty percent of the previous five queries that a user issued in the past two minutes sought entities and, in response, determine that a next query that a user provides is more likely a query that seeks a query and process the query accordingly. In the answer seeking mode, the system 100 may more likely provide an answer to a query. For example, while in the answer seeking mode the system 100, may reduce relevance thresholds for entity types by 20%, 10%, or some other amount.

The system 100 may provide answers which were chosen only because of a reduced threshold in such a way to let the user know that the system is less sure about the correctness of the answer. For example, the system 100 may output, "It appears that you may be seeking answers to questions, so your query has been interpreted as a question and the answer is Ron Weasley."

In some implementations, if the conditions for entering the answer-seeking mode are satisfied, instead of automatically entering this mode, the system 100 may provide an option for a user to request to enter the mode. For example, the system 100 may display, "It appears you may be seeking answers, touch here to enter an answer seeking mode where answers are more likely to be provided in response to queries." In some implementations, the system 100 may also provide an option to exit the mode at any time. For example, while in an answer seeking mode, the system 100 may display "Click here to exit answer seeking mode."

In some implementations, the system 100 may use a query mapper that maps queries to syntactic dependency trees and the entity identifier 130 may use syntactic dependency trees instead of semantic dependency trees. A syntactic dependency tree may be formed based on syntactic relationships between terms in a query while a semantic dependency tree may be formed based on semantic relationships between terms in a query. In some implementations, the system 100 may use both semantic dependency trees and syntactic dependency trees. For example, the system 100 may provide a query to a first query mapper that that maps the query to a semantic dependency tree and then entities may be identified based on the semantic dependency tree, provide the query to a second query mapper that maps the query to a syntactic dependency tree and then entities may be identified based on the syntactic dependency tree, and the system 100 may then increase scores of entities that are identified from both trees, e.g., increase scores by 2%, 5%, or some other amount, or decrease a relevance threshold for entities that are identified from both trees, e.g., reduce threshold by 5%, 10%, or some other amount.

Figure 3:
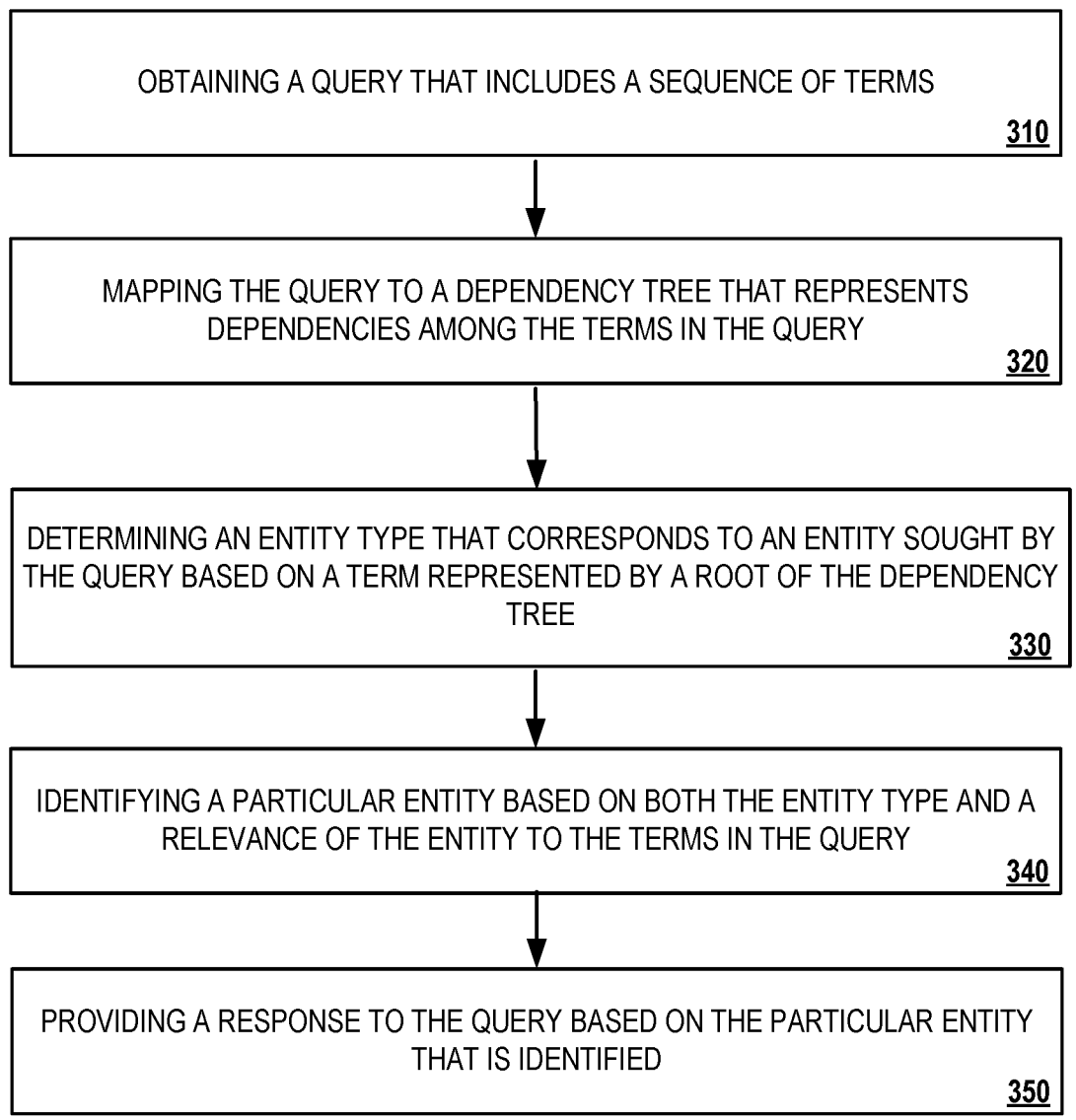
FIG. 3 is a flow diagram that illustrates an example of a process for handling queries that seek entities.

FIG. 3 is a flow diagram that illustrates an example of a process 300 for handling queries that seek entities. The operations of the process 300 may be performed by one or more computing systems, such as the system 100 of FIG. 1.

The process 300 includes obtaining a query that includes a sequence of terms (310). For example, the query mapper 110 may obtain a query of "What is the name of the movie with the young wizard" generated by an automated speech to text recognizer using audio captured by a microphone.

The process 300 includes mapping, based on the sequence of the terms, the query to a dependency tree that represents dependencies among the terms in the query (320). For example, the query mapper 110 may map the query of "What is the name of the movie with the young wizard" to a semantic dependency tree that includes a root that represents the term "movie," a child of the root that represents the term "wizard," and a child from that child that represents the term "young."

The process 300 includes determining an entity type that corresponds to an entity sought by the query based on a term represented by a root of the dependency tree (330). For example, the entity type identifier 120 may determine an entity type of "movie" based on the term "movie" represented by the root of the semantic dependency tree. Determining an entity type that corresponds to an entity sought by the query based on a term represented by a root of the dependency tree may include determining the term represented by the root of the dependency tree represents a type of entity. For example, the entity type identifier 120 may determine that the term "movie" represents entities that are movies. Determining an entity type that corresponds to an entity sought by the query based on a term represented by a root of the dependency tree may include identifying a node in the tree that represents a term that represents a type of entity and includes a direct child that represents a term that indicates an action to perform. For example, the entity type identifier 120 may determine that a node represents the term "movie" which represents entities that are movies and the node includes a direct child that presents a term of "play" which indicates an action.

The process 300 includes identifying a particular entity based on both the entity type and a relevance of the entity to the terms in the query (340). For example, the entity identifier 130 may identify the movie "Harry Potter and the Sorcerer's Stone" based on both the entity type of "movie" identified by the entity type identifier 120 and the relevance of the movie "Harry Potter and the Sorcerer's Stone" to the terms "young" and "wizard." Identifying a particular entity based on both the entity type and a relevance of the entity to the terms in the query may include determining a relevance threshold based on the entity type, determining a relevance score of the particular entity based on the query satisfies the relevance threshold, and, in response to determining the relevance score of the particular entity based on the query satisfies the relevance threshold, identifying the particular entity. For example, the entity identifier 130 may determine a relevance threshold of 90% for an entity type of movie, determine a relevance score of 92% for the movie "Harry Potter and the Sorcerer's Stone" is above the relevance threshold of 90%, and, in response, identify the movie "Harry Potter and the Sorcerer's Stone."

The process 300 includes providing a response to the query based on the particular entity that is identified (350). For example, the query responder 150 may provide audio that includes synthesized speech of "Harry Potter and the Sorcerer's Stone."

Figure 4:
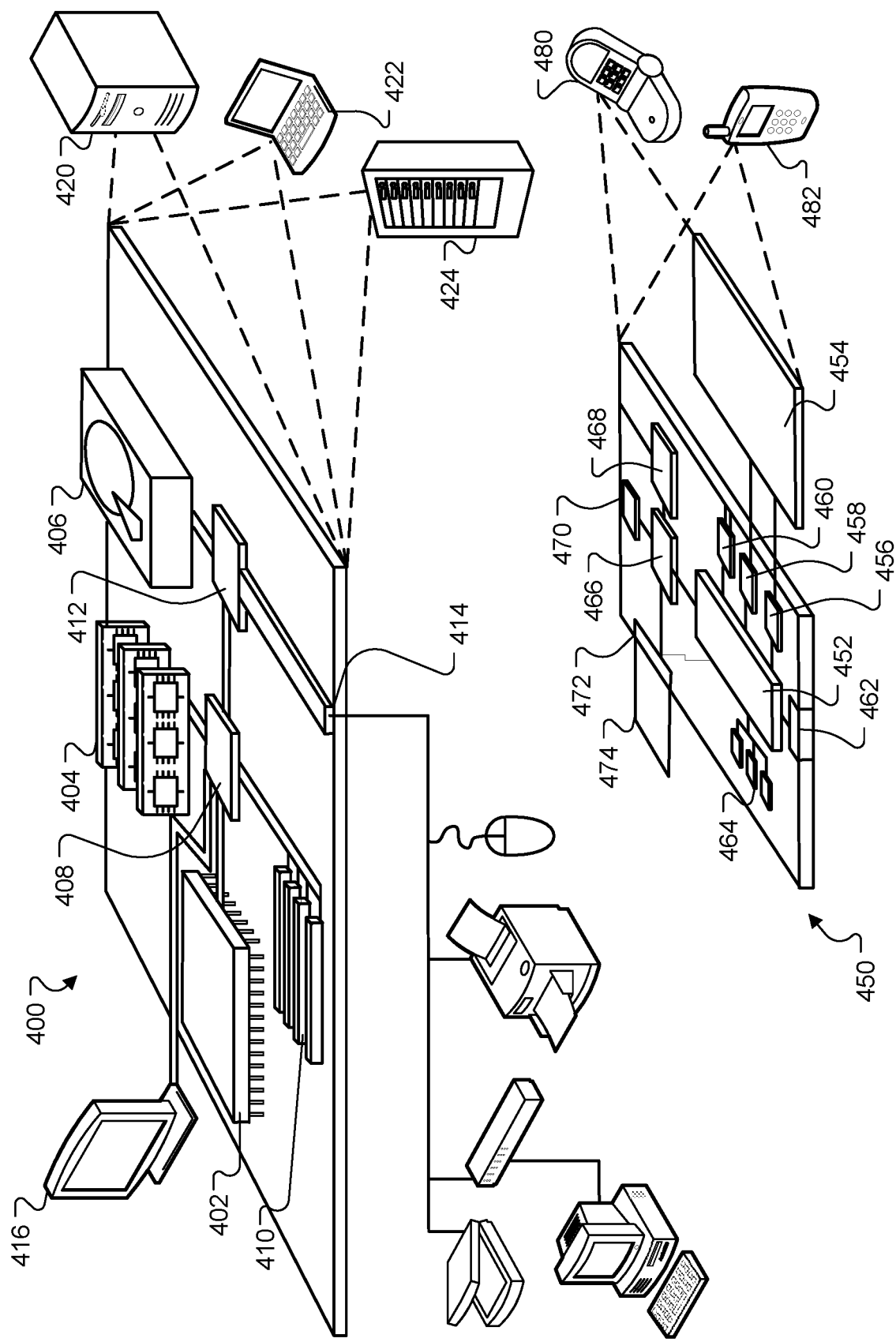
FIG. 4 is a diagram of examples of computing devices.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used herein, the terms "machine-readable medium" "computer-readable medium" refers to any computer program product, apparatus and/or device, e.g., magnetic discs, optical disks, memory, Programmable Logic devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component such as an application server, or that includes a front end component such as a client computer having a graphical user interface or a Web browser through which a user can interact with an implementation of the systems and techniques described here, or any combination of such back end, middleware, or front end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the scope of the invention. For example, various forms of the flows shown above may be used, with steps re-ordered, added, or removed. Also, although several applications of the systems and methods have been described, it should be recognized that numerous other applications are contemplated. Accordingly, other embodiments are within the scope of the following claims.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    obtaining a query that includes a sequence of terms;
    mapping, based on the sequence of the terms, the query to a semantic dependency tree that represents dependencies among the terms in the query, wherein a root of the semantic dependency tree represents one or more terms that both do not modify other terms in the query and are modified by other terms in the query;
    determining that a term represented by the root of the semantic dependency tree corresponds to an entity type and that the root has a direct child that includes a term that indicates an action;
    in response to determining that the term represented by the root of the semantic dependency tree corresponds to the entity type and that the root has the direct child that includes the term that indicates the action, determining an entity type that corresponds to an entity sought by the query as the entity type of a term represented by the root of the semantic dependency tree;
    identifying a particular entity based on both the entity type that was determined to correspond to the entity sought by the query and a relevance of the entity to the terms in the query; and
    providing a response to the query based on the particular entity that is identified.

2. The method of claim 1, wherein determining an entity type that corresponds to an entity sought by the query as the entity type of a term represented by the root of the semantic dependency tree comprises:
    determining the term represented by the root of the dependency tree represents a type of entity.

3. The method of claim 1, wherein identifying a particular entity based on both the entity type that was determined to correspond to the entity sought by the query and a relevance of the entity to the terms in the query comprises:
    determining a relevance threshold based on the entity type;
    determining a relevance score of the particular entity based on the query satisfies the relevance threshold; and
    in response to determining the relevance score of the particular entity based on the query satisfies the relevance threshold, identifying the particular entity.

4. The method of claim 1, wherein identifying a particular entity based on both the entity type that was determined to correspond to the entity sought by the query and a relevance of the entity to the terms in the query comprises:

identifying the particular entity and another entity based on a determination from the semantic dependency tree that the query is not exclusively seeking a single entity.

5. The method of claim 1, wherein identifying a particular entity based on both the entity type that was determined to correspond to the entity sought by the query and a relevance of the entity to the terms in the query comprises:

requesting additional input in response to a determination that multiple entities are relevant to the query and are of the entity type and that the query is exclusively seeking a single entity.

6. The method of claim 1, comprising:

determining that an amount of queries received that sought an entity satisfy a threshold; and in response to determining that an amount of queries received that sought an entity satisfy a threshold, entering an answer seeking mode that resolves queries in favor of seeking an entity.

7. A system comprising:

one or more computers and one or more storage devices storing instructions that are operable, when executed by the one or more computers, to cause the one or more computers to perform operations comprising:

obtaining a query that includes a sequence of terms;

mapping, based on the sequence of the terms, the query to a semantic dependency tree that represents dependencies among the terms in the query, wherein a root of the semantic dependency tree represents one or more terms that both do not modify other terms in the query and are modified by other terms in the query;

determining that a term represented by the root of the semantic dependency tree corresponds to an entity type and that the root has a direct child that includes a term that indicates an action;

in response to determining that the term represented by the root of the semantic dependency tree corresponds to the entity type and that the root has the direct child that includes the term that indicates the action, determining an entity type that corresponds to an entity sought by the query as the entity type of a term represented by the root of the semantic dependency tree;

identifying a particular entity based on both the entity type that was determined to correspond to the entity sought by the query and a relevance of the entity to the terms in the query; and providing a response to the query based on the particular entity that is identified.

8. The system of claim 7, wherein determining an entity type that corresponds to an entity sought by the query as the entity type of a term represented by the root of the semantic dependency tree comprises:

determining the term represented by the root of the dependency tree represents a type of entity.

9. The system of claim 7, wherein identifying a particular entity based on both the entity type that was determined to correspond to the entity sought by the query and a relevance of the entity to the terms in the query comprises:

determining a relevance threshold based on the entity type;

determining a relevance score of the particular entity based on the query satisfies the relevance threshold; and in response to determining the relevance score of the particular entity based on the query satisfies the relevance threshold, identifying the particular entity.

10. The system of claim 7, wherein identifying a particular entity based on both the entity type that was determined to correspond to the entity sought by the query and a relevance of the entity to the terms in the query comprises:

identifying the particular entity and another entity based on a determination from the semantic dependency tree that the query is not exclusively seeking a single entity.

11. The system of claim 7, wherein identifying a particular entity based on both the entity type that was determined to correspond to the entity sought by the query and a relevance of the entity to the terms in the query comprises:

requesting additional input in response to a determination that multiple entities are relevant to the query and are of the entity type and that the query is exclusively seeking a single entity.

12. A non-transitory computer-readable medium storing software comprising instructions executable by one or more computers which, upon such execution, cause the one or more computers to perform operations comprising:

obtaining a query that includes a sequence of terms;

mapping, based on the sequence of the terms, the query to a semantic dependency tree that represents dependencies among the terms in the query, wherein a root of the semantic dependency tree represents one or more terms that both do not modify other terms in the query and are modified by other terms in the query;

determining that a term represented by the root of the semantic dependency tree corresponds to an entity type and that the root has a direct child that includes a term that indicates an action;

in response to determining that the term represented by the root of the semantic dependency tree corresponds to the entity type and that the root has the direct child that includes the term that indicates the action, determining an entity type that corresponds to an entity sought by the query as the entity type of a term represented by the root of the semantic dependency tree;

identifying a particular entity based on both the entity type that was determined to correspond to the entity sought by the query and a relevance of the entity to the terms in the query; and providing a response to the query based on the particular entity that is identified.

13. The method of claim 1, wherein the entity type reflects a category of entities.

14. The method of claim 1, wherein the root of the semantic dependency tree does not represent all terms in the query.

* * * * *